United States Patent
Evans et al.

(10) Patent No.: US 9,663,976 B2
(45) Date of Patent: May 30, 2017

(54) LOCK FOR A ROTATIONAL MOUNT FOR PORTABLE ELECTRONIC DEVICES

(71) Applicant: TomTom International B.V., Amsterdam (NL)

(72) Inventors: Nicholas Alexander Evans, Amsterdam (NL); Mark Lee Dempsey, Beckenham (GB); Reinier Tijssen, Eindhoven (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/799,610

(22) Filed: Jul. 15, 2015

(65) Prior Publication Data
US 2016/0273244 A1    Sep. 22, 2016

(30) Foreign Application Priority Data
Mar. 20, 2015    (GB) .................................. 1504724.4

(51) Int. Cl.
*E05B 73/00*     (2006.01)
*G01C 21/26*     (2006.01)
*B62J 99/00*     (2009.01)

(52) U.S. Cl.
CPC ................ *E05B 73/00* (2013.01); *B62J 99/00* (2013.01); *G01C 21/265* (2013.01); *B62J 2099/0006* (2013.01)

(58) Field of Classification Search
CPC ............................ E05B 73/00; E05B 73/0082
See application file for complete search history.

(56) References Cited

U.S. PATENT DOCUMENTS 5,995,366 A  * 11/1999  Howell ............... E05B 73/0005
                                                                248/552
7,243,514 B2     7/2007  Frantz
(Continued)

FOREIGN PATENT DOCUMENTS

| DE | 20316714 U | 6/2004 |
| WO | 2005035924 A1 | 4/2005 |
| WO | 2014170467 A1 | 10/2014 |

OTHER PUBLICATIONS

TomTom Rider Anti-Theft Solution (TomTom), Jun. 3, 2013 [Online] Available from: http://www.amazon.co.uk/TomTom-Anti-Theft-Solution-Rider-Europe/dp/B00BQ9W4NK/ref=sr_1_25?ie=UTF8&qid=1440084554&sr=8-25&keywords=tomtom+rider+accessories [Accessed: Aug. 20, 2015].
(Continued)

*Primary Examiner* — Christopher Boswell

(57) ABSTRACT

A lock for a rotational mount is disclosed. The lock comprises a plate member arranged to be placed between the rotational mount and a mounting surface, the plate member having a support surface that is arranged to engage with the rotational mount. The lock further comprises a housing extending away from the plane of the support surface of the plate member, the housing comprising a first portion and a second portion, the first portion of the housing defining a gap with an edge of the plate member, and the second portion extending around at least a portion of the edge of the plate member. The lock further comprises a locking member arranged to be movable between an unlocked position and a locked position, wherein the locking member, when in the locked position, extends away from the plane of the support surface of the plate member through the gap defined by the first portion of the housing.

11 Claims, 10 Drawing Sheets

(56) References Cited

U.S. PATENT DOCUMENTS

| | | | |
|---|---|---|---|
| 8,191,851 B2 * | 6/2012 | Crown | B60R 11/0241 |
| | | | 248/316.4 |
| 8,711,553 B2 * | 4/2014 | Trinh | A47F 7/0246 |
| | | | 248/206.5 |
| 9,019,698 B2 | 4/2015 | Thiers | |
| 9,163,433 B2 * | 10/2015 | Sedon | E05B 73/0082 |
| 9,240,651 B2 | 1/2016 | Thiel | |
| 9,285,832 B2 * | 3/2016 | Galant | F16M 11/105 |
| 2013/0026322 A1 * | 1/2013 | Wheeler | A47F 7/024 |
| | | | 248/289.31 |
| 2014/0260443 A1 * | 9/2014 | Grziwok | E05B 65/00 |
| | | | 70/62 |
| 2014/0302700 A1 | 10/2014 | Makinen | |
| 2014/0355200 A1 | 12/2014 | Thiers | |
| 2014/0356667 A1 | 12/2014 | Kim | |
| 2014/0357094 A1 | 12/2014 | Kim | |
| 2015/0292669 A1 * | 10/2015 | Floersch | G06F 1/1626 |
| | | | 248/553 |
| 2015/0305518 A1 * | 10/2015 | Galant | F16M 11/041 |
| | | | 248/551 |

OTHER PUBLICATIONS

Search report of United Kingdom application No. GB1503987.8, dated Jul. 23, 2015.
Search report of United Kingdom application No. GB1504724.4, dated Aug. 27, 2015.

* cited by examiner

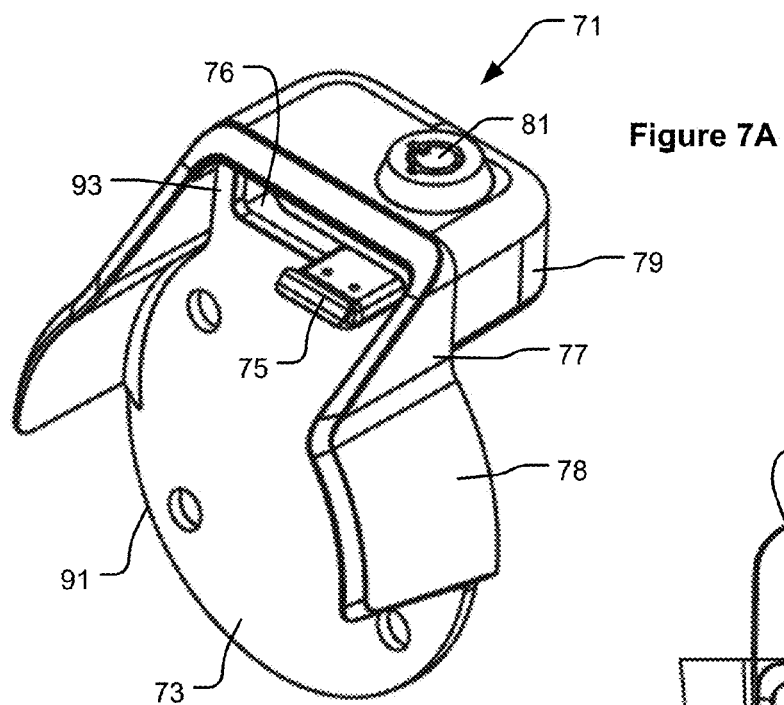
Figure 7A
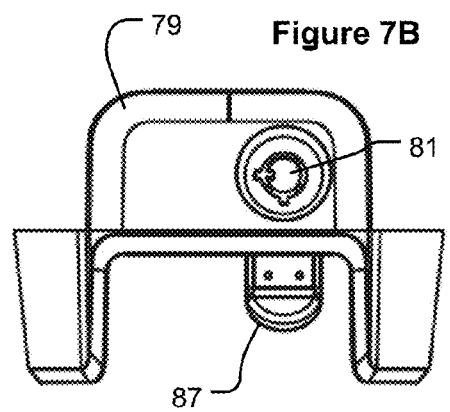
Figure 7B
Figure 7C
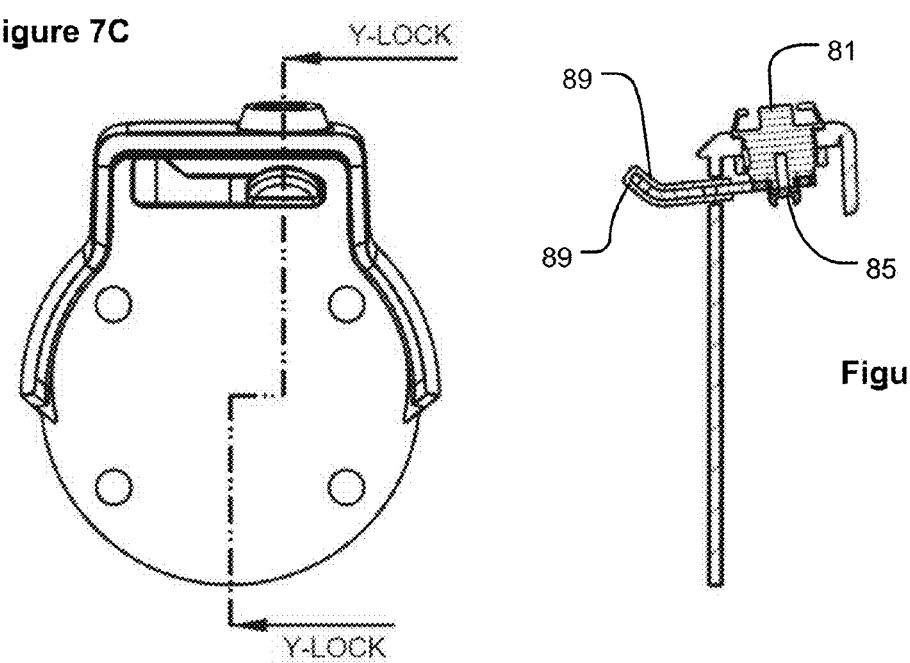
Figure 7D
SECTION Y-LOCK-Y-LOCK

LOCK FOR A ROTATIONAL MOUNT FOR PORTABLE ELECTRONIC DEVICES

CROSS-REFERENCES TO RELATED APPLICATIONS

The application claims priority to United Kingdom Patent Application No. 1504724.4, filed Mar. 20, 2015; the entire contents of which is incorporated herein by reference.

FIELD OF THE INVENTION

The present invention relates to a mounting assembly for portable electronic devices, such as such as mobile phones, smart phones, PDAs, tablet computers, other handheld personal computers, portable audio systems (e.g. radio players, MP3 players, etc), multimedia players, games consoles, and portable navigation devices (so-called PNDs). In embodiments, the invention is more specifically related to a mounting assembly for a portable navigation device configured for use with a motorcycle. The present invention further relates to a lock for use with such a mounting assembly.

BACKGROUND TO THE INVENTION

There is a growing number or portable electronic devices which are capable of displaying information on a display device in a number of orientations, e.g. a portrait orientation, a landscape orientation, etc, and that often display different information depending on the orientation of the electronic device. One such type of portable electronic device is a navigation device, which are designed to be mounted on or within vehicles, and that provide functionality such as navigation, route planning, traffic updates, etc. Various mounting solutions have been developed that can support a portable electronic device in a number of different orientations, although often the user is required to remove the device from the mount before it can be docked again in a different orientation. It can also be problematic with known mounting solutions to allow for a device to be mounted in a plurality of orientations, while simultaneously providing power to the device using a power connector. These problems with known mounting solutions are a particular issue when mounting a portable electronic device, such as a navigation device, to a motorcycle or other similar type of vehicles like scooters, mopeds, etc. There therefore remains a need for improved mounting solutions for portable electronic devices, and in particular portable navigation devices, that mitigate or reduce some of the above problems.

SUMMARY OF THE INVENTION

According to an aspect of the present invention there is provided a mount for a portable electronic device, comprising:

a support member arranged to engage against a surface of a device mounted thereto, the support member comprising a power connector having one or more electrical contacts to deliver electrical power to the device;

a first ring member coupled to the support member, wherein the first ring member comprises a surface comprising a plurality of detents, the detents forming recesses therebetween; and a second ring member configured for attachment to a surface, wherein the second ring member comprises a surface comprising a plurality of detents, the detents forming recesses therebetween, wherein the detents and recesses of the surface of the second ring member are shaped to correspond to the detents and recesses of the surface of the first ring member, wherein the first ring member is configured to be rotatable relative to the second ring member, and wherein the surface of the first ring member is provided adjacent to the surface of the second ring member such that the detents of the first ring member engage with the recesses of the second ring member at a plurality of different angular positions when the first ring member is rotated relative to the second ring member, and wherein the first and second ring members provide an aperture to enable an electronic connection to pass through the aperture to the power connector of the support member.

This provides the advantage that the mount allows the portable electronic device, such as a navigation device, to be provided in different angular positions. For instance the device may be provided in a landscape or a portrait orientation. The detents and corresponding recesses cause the provision of haptic feed back to the user so that the user can feel when the mount is in a locked position. The aperture which is provided though the mount may enable a simple electrical connection to be provided to the device, while still allowing for the rotation of the device into a plurality of different angular positions.

In embodiments, the second ring member comprises a detent ring and a rear housing, the surface of the second ring member being provided on the detent ring, and wherein the detent ring is provided between the first ring member and the rear housing. The detent ring may be coupled to the rear housing so that the detent ring does not rotate relative to the rear housing. The detent ring may be coupled to the rear housing so that the detent ring can move axially relative to the rear housing.

In embodiments, the first ring member comprises a detent housing and an assembly ring, wherein the assembly ring is coupled to the detent housing with the second ring member therebetween so that a constant separation is maintained between the detent housing and the rear housing. The surface of the first ring member may be provided on the detent housing.

In embodiments, the mount further comprises one or more biasing members positioned between the first and second ring members so as to bias the detent ring against the detent housing and maintain a contact between the surfaces of the first and second ring members. The one or more biasing members may be positioned between the rear housing and the detent ring. The one or more biasing members may be in a compressed state when the first ring member has been rotated to be in an angular position with the second ring member so that the detents of the surface of the first ring member engage with the detents of the surface of the second ring member. As will be appreciated, when the one or more biasing members are in a compressed state, then the mount can be said to be in an unlocked position. The one or more biasing members may be in a relaxed state when the first ring member has been rotated to be in an angular position with the second ring member so that the detents of the surface of the first ring member engage with the recesses of the second ring member. As will be appreciated, when the one or more biasing members are in a relaxed state, then the mount can be said to be in a locked position. The one or more biasing members may comprise at least one spring.

In embodiments, the aperture is provided through the centre of the first and second ring members. The aperture may be provided by an alignment of apertures in each of the detent housing, detent ring, rear housing and assembly ring.

In embodiments, the number of detents of the surfaces of the first and second ring members corresponds to a maximum number of locked positions of the mount. The number of detents may be four, although it will be appreciated that any number may be used as desired. The detents of the surfaces of the first and second ring members may be equally spaced from each other. The detents of the surfaces of the first and second ring members may be angled on their leading and trailing edges, the angled edge formed an oblique angle to the surface of the respective preceding or succeeding recess.

In embodiments, the rear housing may comprise means for fixedly attaching the mount to the surface. The surface may, for example, be a surface of a motorcycle of similar vehicle.

In embodiments, the mount may further comprise an electrical cable coupled to the power connector of the support member, the electrical cable passing through the aperture formed by the first and second ring members.

It is considered that a lock for a rotational mount, such as, for example, one as described above, may be new and inventive in its own right. Such a lock allows a user to leave the portable electronic device attached to the mount, for example, when a motorcycle is parked.

Thus, according to another aspect of the invention, there is provided a lock for a rotational mount, comprising:

a plate member arranged to be placed between the rotational mount and a mounting surface, the plate member having a support surface that is arranged to engage with the rotational mount;

a housing extending away from the plane of the support surface of the plate member, the housing comprising a first portion and a second portion, the first portion of the housing defining a gap with an edge of the plate member, and the second portion extending around at least a portion of the edge of the plate member; and a locking member arranged to be movable between an unlocked position and a locked position, wherein the locking member, when in the locked position, extends away from the plane of the support surface of the plate member through the gap defined by the first portion of the housing.

Furthermore, according to another aspect of the invention, there is provided a mounting system for a portable electronic device, comprising:

a rotational mount comprising: a support member arranged to engage against a surface of a device mounted thereto; and a paddle that can be depressed to allow the portable electronic device to be removed from the support member, wherein the rotational mount being rotatable between a plurality of different angular positions; and a lock comprising: a plate member arranged to be placed between the rotational mount and a mounting surface; a locking member arranged to be movable between a locked position and an unlocked position, wherein, when in the locked position, the locking member prevents depression of the paddle when the rotational mount is in a first angular position, and, when in the unlocked position, the locking member allows depression of the paddle when the rotational mount is in the first angular position; and a housing arranged to prevent depression of the paddle when the rotational mount is in a second angular position.

In embodiments, the first angular position of the rotational mount may enable the portable electronic device to be mounted in a landscape orientation, and the second angular position of the rotational mount may enable the portable electronic device to be mounted in a portrait orientation.

The lock according to the latter aspect may, in embodiments, be the lock as described above. Thus, the plate member may have a support surface that is arranged to engage with the rotational mount, and the lock may further comprise a housing extending away from the plane of the support surface of the plate member, the housing comprising a first portion and a second portion, the first portion of the housing defining a gap with an edge of the plate member, and the second portion extending around at least a portion of the edge of the plate member. The locking member, when in the locked position, may extend away from the plane of the support surface of the plate member through the gap defined by the first portion of the housing.

In embodiments, the locking member of the lock, when in the unlocked position, may extend parallel to the plane of the support surface of the plate member. The locking member may be arranged to protrude beyond the housing when in the locked position. The locking member may be arranged to be moved between the locked position and the unlocked position by turning a key.

A mount as described hereinabove, optionally in combination with a lock as described above, may be used to mount a portable electronic device, preferably a portable navigation device (PND), to a power connector in a vehicle such as a car, motorbike, bicycle, or boat, for example. The mount may further comprise one or more of: data storage means; a power adaptor; a voltage transformer; a loudspeaker, mobile telecommunication circuitry or devices; and a global navigation satellite system (GNSS) receiver, such as a global positioning system (GPS) receiver. The one or more electrical contacts of the power connector may be connected by a suitable circuitry to such electronic devices where provided in the mount.

The invention may find use in mounting a portable electronic device that has a touch screen device. The portable electronic device may comprise a mobile phone, smart phone, PDA, portable audio system (e.g. radio player, MP3 player), multi-media player, games console, tablet computer, portable personal computer or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various preferred embodiments of the present invention will now be described, by way of example only, and with reference to the following figures, in which:

FIGS. 7A to 7D illustrate a lock for the mounting assembly in a locked configuration;

DETAILED DESCRIPTION OF THE INVENTION

Figures 1A, 1B:
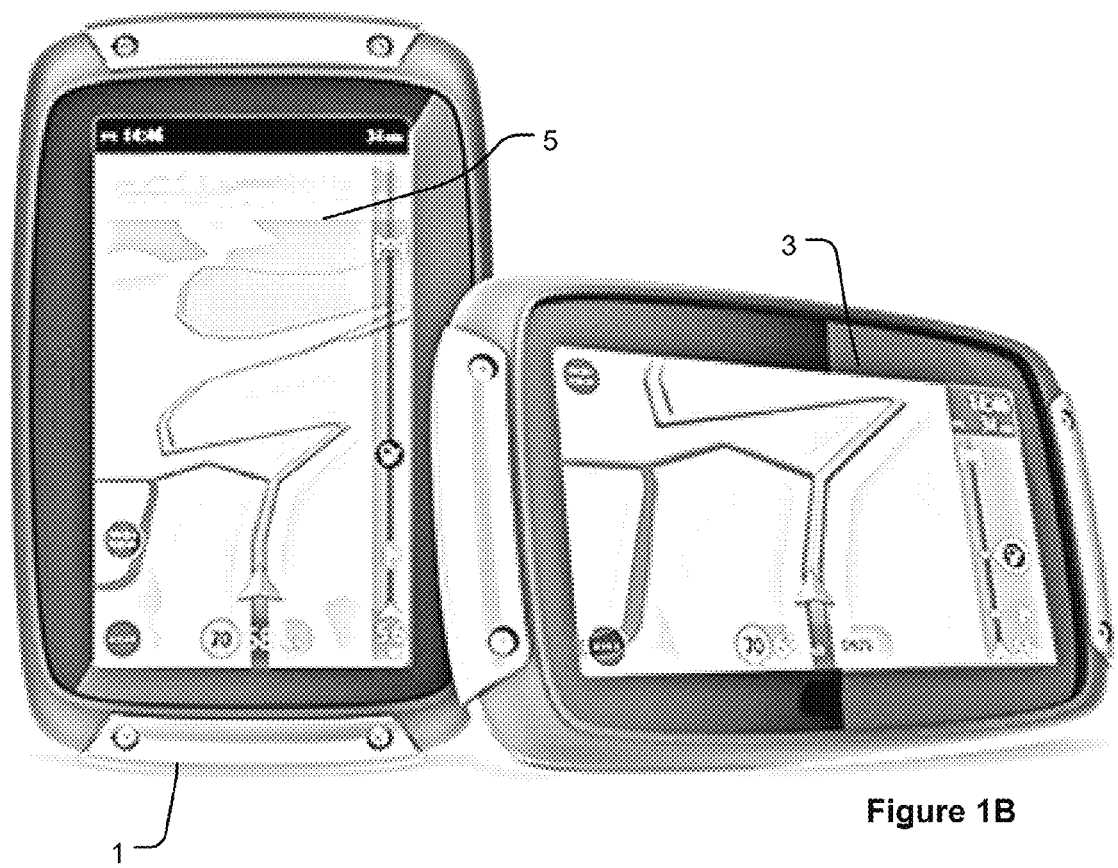
FIGS. 1A and 1B illustrate a navigation device in landscape and portrait orientations.

The present invention, at least in preferred embodiments, relates to an active dock that provides an electrical connection for portable electronic devices that may be removably connected to a mount, in particular to portable navigation devices (PNDs) that may be mounted to a motorcycle or other similar vehicle, such as scooter or moped. It is an aim of the present invention to provide a compact and attractive mounting solution wherein a user can rotate a docked device, and which provides good haptic feedback to the user such that it is clear to the user, even when wearing gloves, that the device is in a correct orientation from a plurality of possible orientations. It is also an aim of the present invention to provide a lock which prevents the portable electronic device from being removed from the mount, despite the mount being rotatable in a number of different angular orientations. The terms "mount", "dock" and "mounting assembly" are used interchangeably throughout the description, and unless the context requires otherwise reference the same product. Similarly. the terms "lock" and "locking mechanism" are used interchangeably throughout the description, and unless the context requires otherwise reference the same product.

The Figures illustrate a mount 21 for a portable electronic device 1, comprising: a support member 24 arranged to engage against a surface of a device mounted thereto, the support member comprising a power connector 22 having one or more electrical contacts to deliver electrical power to the device; a first ring member 23 coupled to the support member 22, wherein the first ring member comprises a surface 31 comprising a plurality of detents 45, the detents forming recesses 47 therebetween; and a second ring member 25 configured for attachment to a surface, wherein the second ring member comprises a surface 33 comprising a plurality of detents 41, the detents forming recesses 43 therebetween, wherein the detents and recesses of the surface of the second ring member are shaped to correspond to the detents and recesses of the surface of the first ring member, wherein the first ring member 23 is configured to be rotatable relative to the second ring member 25, and wherein the surface 31 of the first ring member is provided adjacent to the surface 33 of the second ring member such that the detents 45 of the first ring member engage with the recesses 43 of the second ring member at a plurality of different angular positions when the first ring member is rotated relative to the second ring member, and wherein the first and second ring members provide an aperture 30 to enable an electronic connection to pass through the aperture to the power connector of the support member 24.

FIGS. 1A and 1B illustrate an example portable navigation device 1 having a display device, which may comprise a touchscreen display. The navigation device 1 may be configured to execute navigation software so as to provide one or more navigation-related features, such as route planning, guidance along a planned route, current location information, traffic information, estimated time of arrival at a destination, alternative route suggestions, favourite destinations, etc.

In FIG. 1A the navigation device is provided in a landscape orientation. A representation of a digital map 3 is displayed on the display 5 of the navigation device 1, the representation being displayed showing a route to be followed.

In FIG. 1B the navigation device 1 is provided in a portrait orientation. The same representation of the digital map 3 is displayed on the display 5, however, due to the different orientation, more information about the road in front of the user can be shown to the user. This may be useful to provide the user with information about the bends or other hazards in the road ahead.

Figure 2A:
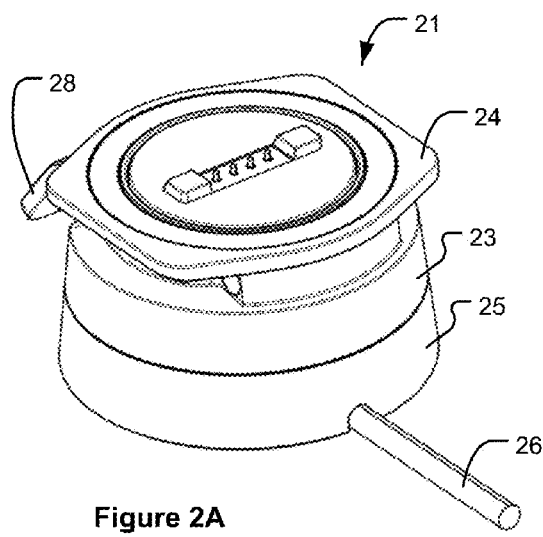
FIGS. 2A to 2D illustrate a mounting assembly for the navigation device.
Figure 2B:
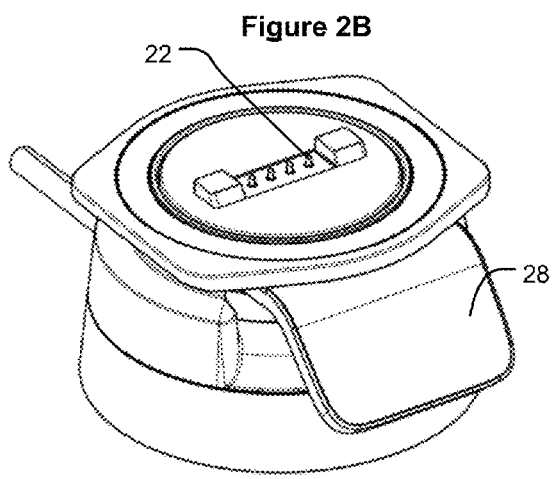
Figure 2C:
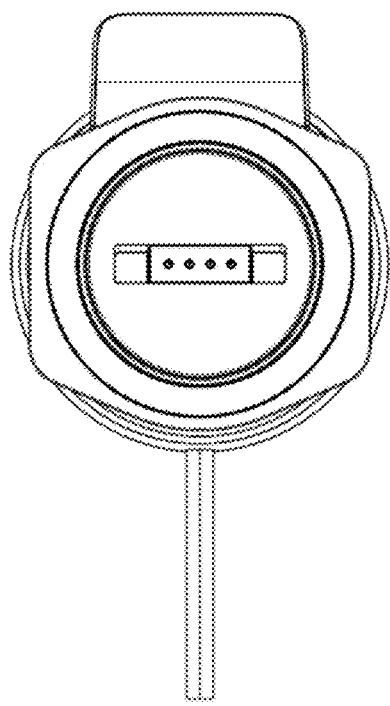
Figure 2D:
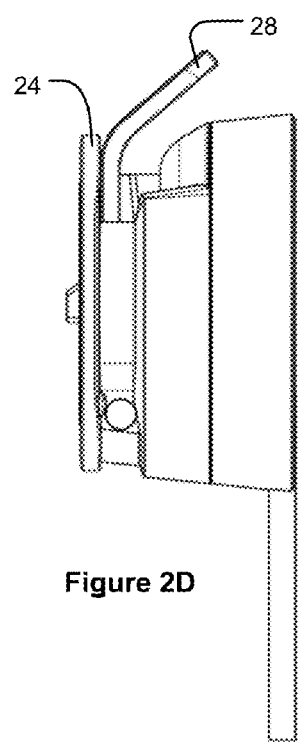

FIGS. 2A to 2D illustrate an example mounting assembly 21 for the navigation device 1. The mounting assembly 21 may be configured to be attached to a motorcycle or any other suitable vehicle. FIG. 2A illustrates a lower view of the mounting assembly 21, FIG. 2B illustrates an upper view of the mounting assembly 21, FIG. 2C illustrates a front view of the mounting assembly 21 and FIG. 2D illustrates a side view of the mounting assembly 21. While the mount assembly of the present invention is described herein primarily with reference to a portable navigation device, it will be appreciated that the described mount can be used with any type of portable electronic device having a display screen, such as a portable personal computer, mobile telephone, smart phone, PDA, portable audio system (e.g. radio player, MP3 player), multi-media player, games console or tablet computer, and which is arranged to operate in different orientations. Similarly, while the mounting assembly is particularly beneficial when mounted to a motorcycle or other similar vehicle, the mounting assembly can be arranged to be mounted to any suitable surface, whether of a vehicle or not, as desired.

The mounting assembly 21 comprises a support member 24, a first ring member 23 and a second ring member 25. The first ring member 23 and the second ruing member 25 are configured to be rotatable relative to each other. Examples of the rotation mechanism which may be provided within the mounting assembly 21 are illustrated in FIGS. 3 to 6B and described below.

The support member 24, which is coupled to the first ring member 23, may be configured for attachment to a rear of the navigation device 1. The support member 24, which may be in the form of a front plate, comprises a plurality of electrical contacts 22 which may be configured to connect to corresponding connections on the rear of a navigation device 1. It is to be appreciated that other means for attaching the support member 24 to a navigation device 1 may be used in other embodiments of the invention.

In the example of FIGS. 2A to 2D the mounting assembly 21 also comprises a paddle 28. The paddle 28 may be configured to enable a user to release and/or attach the navigation device 1 to the support member (or front plate) 24. In some examples the paddle 28 may be configured to enable a user to release the navigation device 1 by depressing the paddle 28.

The second ring member 25 of the mounting assembly 21 may be configured for attachment to a vehicle such as a motorcycle or any other suitable vehicle. The second ring member 25 comprises the rear of the mounting assembly 21. The second ring member 25 may be attached to a vehicle by any suitable means.

In the example of FIGS. 2A to 2D the mounting assembly also comprises an electrical connection 26. The electrical connection 26 may comprise wires or any other suitable means which may be used to provide power and/or data to the navigation device 1. The electrical connection 26 may be connected to the electrical contacts 22 to enable power and/or data to be provided to the navigation device 1. The electrical connection 26 may extend from the rear of the front plate 24 through both the first ring member 23 and the second ring member 25 of the mounting assembly 21 and out of the second ring member 25. The electrical connection 26 may extend through an aperture 30 within the mounting assembly 21. Examples of the aperture are illustrated in FIGS. 3 to 6B and described below.

Figure 3:
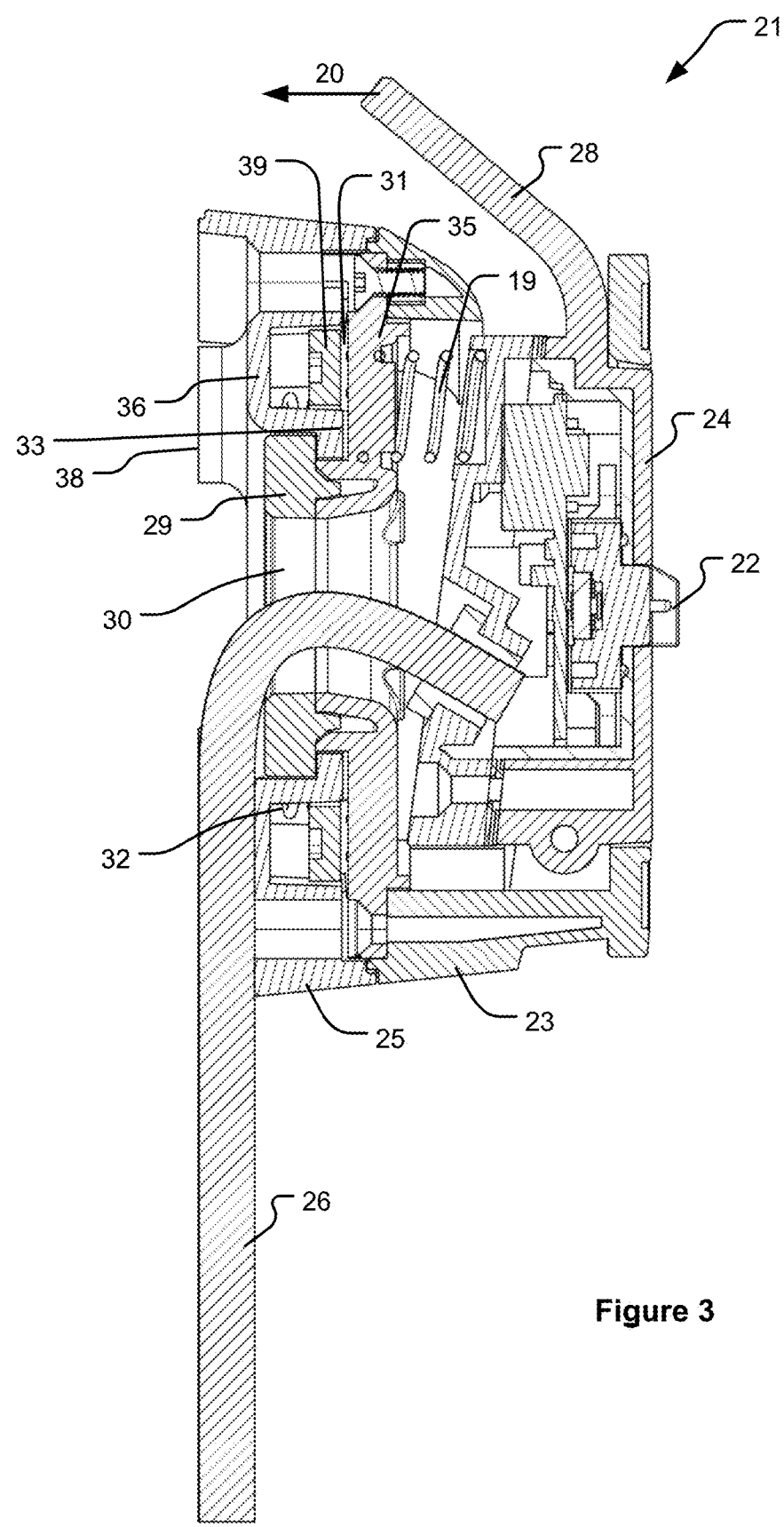
FIG. 3 illustrates a cross section through the mounting assembly.

FIG. 3 illustrates a cross section through the mounting assembly 21. The mounting assembly 21 comprises a first ring member 23 and a second ring member 25 as described above. Corresponding reference numerals are used for corresponding features.

The first ring member 23 may be coupled to a support member (or front plate) 24 and paddle 28 as described above. The paddle 28 may be configured to enable a user to release a navigation device 1 form the front plate 24 by depressing the paddle 28. The user may depress the paddle 28 by applying a force in an axial direction towards the rear of the mounting assembly 21 as indicated by the arrow 20. When the user pushes the paddle 28 this also moves the front plate 24 in an axial direction towards the rear of the mounting assembly 21. This disengages the electrical contact 22 from the navigation device 1 and also allows the user to remove the navigation device 1 from the mounting assembly 21.

A first biasing member 19 may be provided between the paddle 28 and the second ring member 25. The first biasing member 19 may be configured to push the front plate 24 outwards, away from the second ring member 25. In the example of FIG. 3 the first biasing member 19 comprises a spring. When the user depresses the paddle 28 this may compress the spring. When the user releases the paddle 28 the spring restores the front plate 24 and the paddle 28 to their original position.

The first ring member 23 also comprises a first surface 31. The first surface 31 is provided internally of the mounting assembly 21. The first surface 31 may comprise a plurality of detents and recesses as described below.

In the example embodiments the first surface 31 is provided on a detent housing 35. The detent housing 35 is coupled to the front plate 24 so that the front plate 24 does not rotate relative to the detent housing 35. The detent housing 35 may also be coupled to the second ring member 25 so that the detent housing can move rotationally relative to the second ring member 25. The detent housing 35 may be coupled to the second ring member 25 so that the detent housing does not move axially relative to a rear plate 38 of the second ring member 25.

The second ring member 25 provides the rear of the mounting assembly 21. The second ring member 25 comprises a rear housing 36. The rear housing 36 may comprise a rear plate 38. The rear plate 38 may form the rear surface of the mounting assembly 21.

The second ring member 25 also comprises a second surface 33. The second surface 33 is provided internally of the mounting assembly 21. The second surface 33 may also comprise a plurality of detents and recesses as described below. The detents and recesses of the second surface 33 may be configured to correspond to the detents and recesses of the first surface 31. The detents and recesses of the second surface 33 may be configured to correspond to the detents and recesses of the first surface 31 so that the detents of the second surface 33 fit tightly into the recesses of the first surface 31.

The second surface 33 is provided adjacent to the first surface 31. The second surface 33 is provided adjacent to the first surface 31 so that at least a part of the first surface 31 touches the second surface 33. The first and second surfaces 31, 33 are arranged so that when the first ring member 23 rotates relative to the second ring member 25 the detents of the second surface 33 engage and/or disengage with the recesses on the first surface as the first surface 31 slides over the second surface 33.

In the example embodiments the second ring member 25 comprises a detent ring 9 and a rear housing 36. The second surface 33 may be provided on the detent ring 39. The detent ring 39 may be coupled to the rear housing 36 so that the rear housing 36 does not rotate relative to the detent ring 39. The detent ring 39 may be coupled to the rear housing 36 so that the detent ring 39 does move axially relative to the rear housing 36. For example, the detent ring 39 may have a profiled surface that interlocks with a corresponding profiled surface of the rear housing 36, such that the detent ring 39 always rotates with the rear housing 36, i.e. the detent ring and the rear housing always maintain a constant angular relationship. The detent ring 39 may be configured to move axially relative to the rear housing 36 when the first ring member 23 is rotated relative to the second ring member 25. This may maintain constant separation between the rear housing 36 and the first ring member 23.

The second ring member 25 also comprises one or more second biasing members 32. The second biasing members 32 are provided within the rear housing 36. The second biasing members 32 may be positioned between the rear housing 36 and the detent ring 39 and configured to bias the detent ring 39 against the first ring member 23. In the example of FIG. 3 the second biasing members 32 may comprise one or more springs.

The example mounting assembly 21 of FIG. 3 also comprises an assembly ring 29. The assembly ring 29 may be configured to connect the detent housing 35 to the rear housing 36. The assembly ring 29 may be configured to prevent axial movement of the detent housing 35 relative to the rear housing 36. However the assembly ring 29 may allow axial movement of the detent ring 39 relative to the rear housing 36.

The mounting assembly 21 also comprises an aperture 30. The aperture 30 provided through the centre of the first ring member 21 and the second ring member 23. The aperture 30 extends through both the detent housing 35 and the detent ring 39.

The aperture 30 may be configured to enable the electrical connection 26 to pass through the mounting assembly 21 to the front plate 24. This enables a simple electrical connection 26 to be provided, while still allowing for the rotation of the first ring member 23 relative to the second ring member 25.

The rear housing 36 may be coupled to a rear plate 38. The rear plate 38 may comprise means for fixedly attaching the mount 21 to a surface, e.g. a surface of a motorcycle. The means may comprise a number of screw holes or other similar bolting means.

Figure 4A:
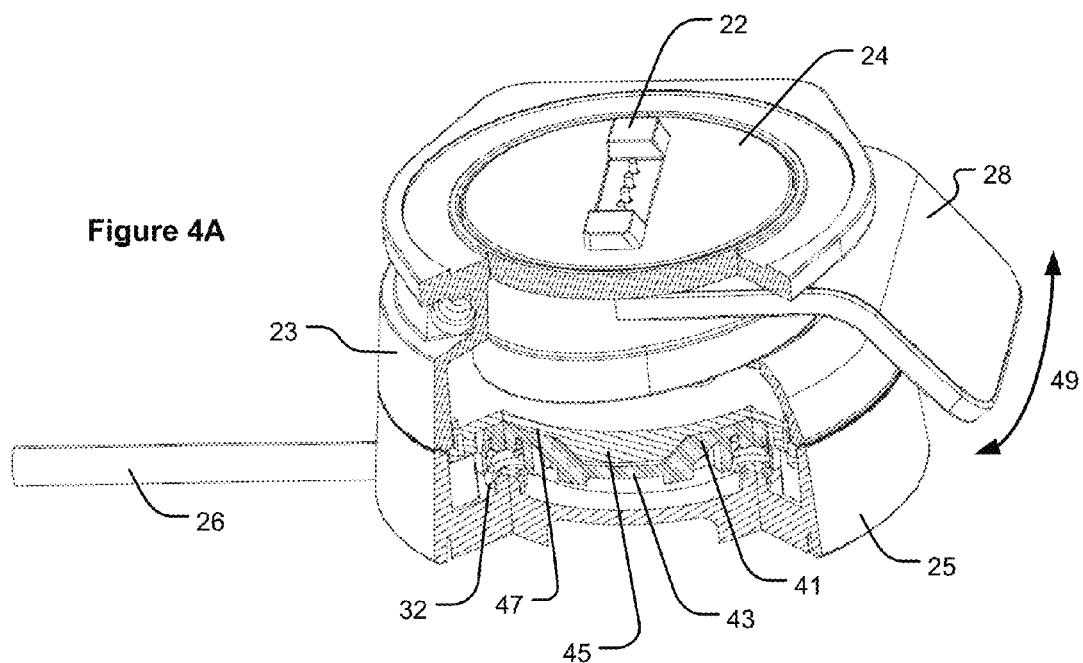
FIGS. 4A and 4B illustrate partial cut outs of the mounting assembly.
Figure 4B:
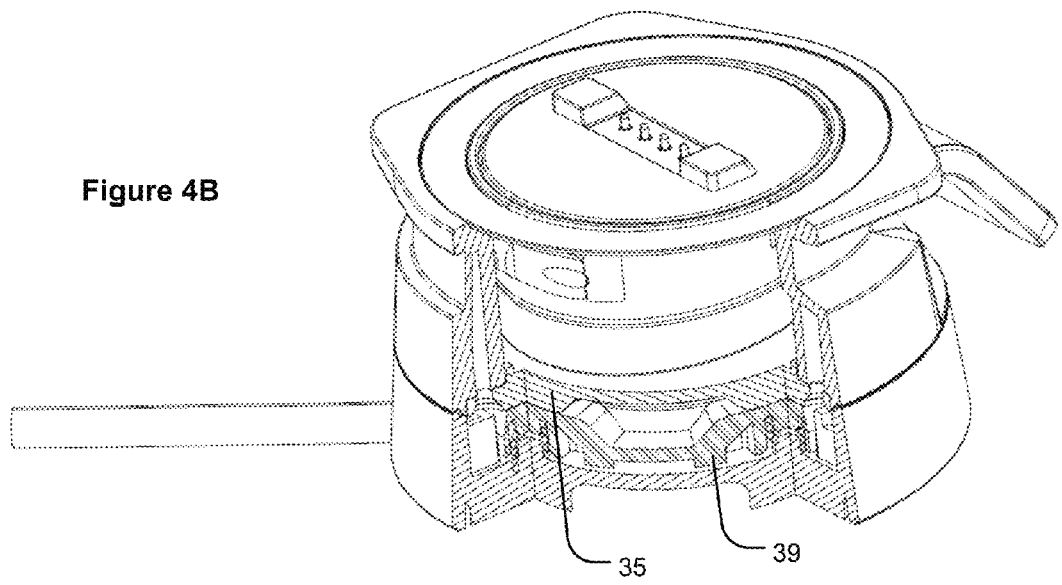

FIGS. 4A and 4B illustrate partial cut outs of the mounting assembly 21. Corresponding reference numerals are used for corresponding features. In the example of FIG. 4A the mounting assembly 21 is arranged in a first or "locked" configuration. In the example of FIG. 4B the mounting assembly 21 is arranged in a second or "unlocked" configuration. When the mounting assembly 21 is in the locked configuration the first ring member 23 can only be rotated relative to the second ring member 25 if the user applies a force which is above a threshold. When the mounting assembly 21 is in the unlocked configuration the first ring member 23 may be rotated relative to the second ring member 25 even if the user applies a force which is below the threshold.

The mounting assembly 21 comprises a detent ring 39 and a detent housing 35 which may be provided within the first and second ring members 23, 25 as described above. The first surface 31 is provided on the detent housing 35 and comprises a plurality of detents 45 and recesses 47. The second surface 33 is provided on the detent ring 39 and comprises a plurality of corresponding detents 41 and recesses 43. As will be appreciated, the recesses in the surfaces are typically caused simply by the presence of the detents. Although recesses may be provided into the detents as desired.

In the locked configuration of FIG. 4A the detents 41 of the detent ring 39 are engaged within the recesses 47 of the detent housing 35. The detents 45 of the detent housing 35 may also be engaged within the recesses 43 of the detent ring 39. When a detent 41, 45 is engaged with a recess 47, 43 the detent 41, 45 fits tightly into the recess 47, 43 so that the detent 41, 45 can only be moved out of the recess 47, 43 if a user applies a force which is above a threshold. When the mounting assembly 21 is in a locked configuration all, or almost all, of the first surface 31 may be in contact with the second surface 33.

In the examples of FIGS. 4A and 4B the biasing member 32 comprises a spring. The spring pushes the detent ring 39 close to the detent housing 35. The spring may allow for gap to be provided between the detent ring 39 and the rear plate 38.

A user may be able to move the mounting assembly out of the locked position of FIG. 4A by applying a sufficient rotational force as indicated by the arrow 49. In the examples of FIGS. 4A and 4B the detents 41, 45 have angled edges (at their leading and trailing edges). The angled edges form an oblique angle to the respective preceding or succeeding recess. The angled surfaces may enable the detents 41, 45 to be pushed out of the recesses 47, 43 by applying sufficient force, i.e. to move the mount 21 out of the locked position. Similarly, the angled surfaces may guide the detents 41, 45 into the recesses 47, 43 when the first ring member 23 is rotated relative to the second ring member 25, i.e. to move the mount 21 into the lock position. The recesses 47, 43 may be shaped to correspond to the detents 41, 45.

In the example of FIGS. 4A and 4B the detents 41, 45 and recesses 47, 43 are symmetrical so that each side of the detent 41, 45 is provided at the same angle. This may enable a user to rotate the portions of the mounting assembly both clockwise and anti-clockwise.

In FIG. 4B the user has rotated the mounting assembly 21 of FIG. 4A though approximately 45° so that the mounting assembly 21 is now provided in an unlocked or intermediate configuration. In this position the detent 45 of the detent housing 35 has been removed from the recess 43 of the detent ring 39 so that the detents 45, 41 are now disengaged. The detent 45 of the detent housing 35 now abuts a detent 41 of the detent ring 39. This pushes the detent ring 39 back towards the rear housing 36 and compresses the spring 32. When the mounting assembly 21 is in an unlocked configuration the detents 45 of the first surface 31 may be the only part of the first surface which is in contact with the second surface 33. In the unlocked position only a small portion of the first surface 31 is in contact with the second surface 33.

In the unlocked position the detents 45, 41 are disengaged. This means that there is little resistance to the rotational movement of the detent housing 35 relative to the detent ring 39. This means that the force required for further rotation of the respective portions of the mounting assembly 21 is less than the force required to move the mounting assembly 21 out of the locked configuration.

If the user continues to rotate the mounting assembly then a further detent 41 of the detent ring 39 would be provided within the recess 47 of the detent housing 39. This would provide a second locked position which may be different to the first locked position.

In some examples four detents and four recesses may be provided on each of the detent housing 35 and the detent ring 39. This may enable four different locked configurations to be provided. Where the detents and recesses are equally spaced around the detent housing 35 and the detent ring 39 this may provide two landscape positions and two portrait positions for the navigation device 1. It is to be appreciated that any number and arrangements of the detents and recesses may be provided in order to enable locked positions at different angular orientations.

Figure 5A:
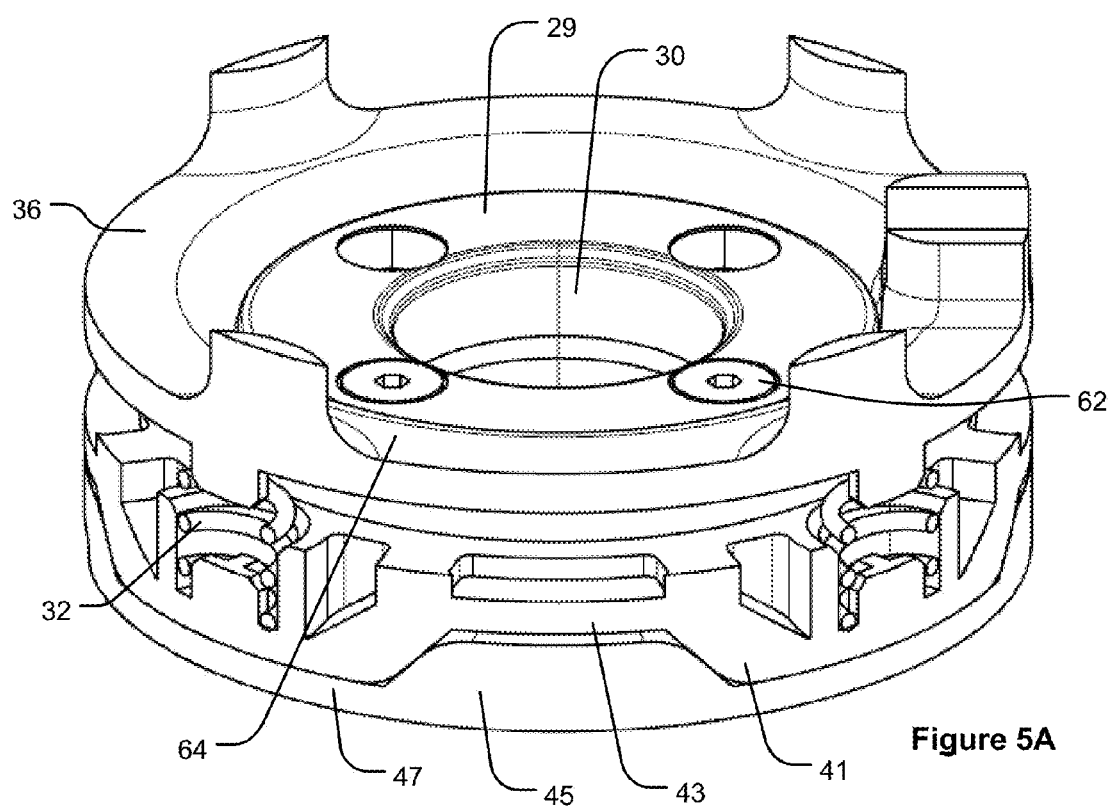
FIGS. 5A and 5B illustrate portions of the mounting assembly in a first or "locked" position.
Figure 5B:
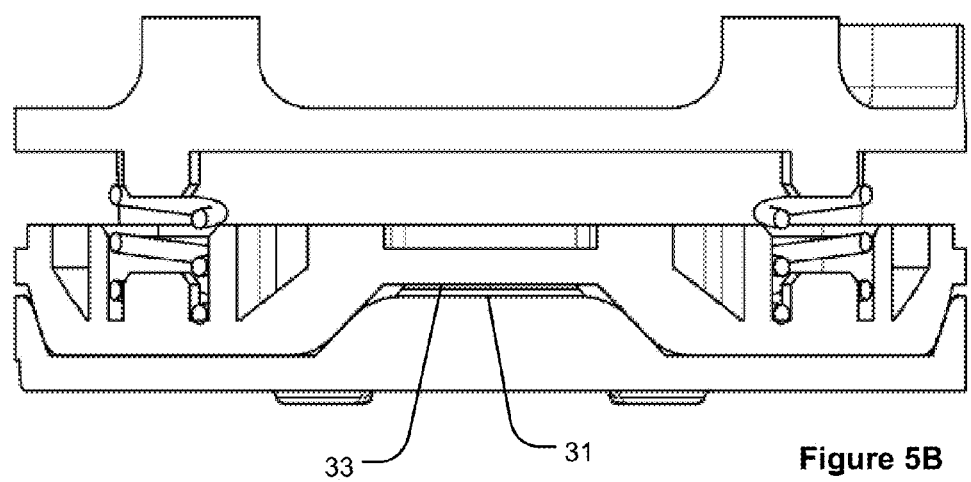

FIGS. 5A and 5B illustrate portions of the detent housing 35 and the detent ring 39 of the mounting assembly 21 in a locked configuration. FIG. 5A illustrates a perspective view and FIG. 5B illustrates a cross section.

In the example of FIGS. 5A and 5B four detents 45 and four recesses 47 are provided on the detent housing 35 and similarly four detents 41 and four recesses 43 are provided on the detent ring 39. In the example of FIGS. 5A and 5B the biasing member 32 comprises four springs configured to push the detent ring 39 against the detent housing 35. It can be seen that when the mounting assembly 21 is arranged in the locked configurations there is substantially no gap provided between the detent ring 39 and the detent housing 35.

Figure 6A:
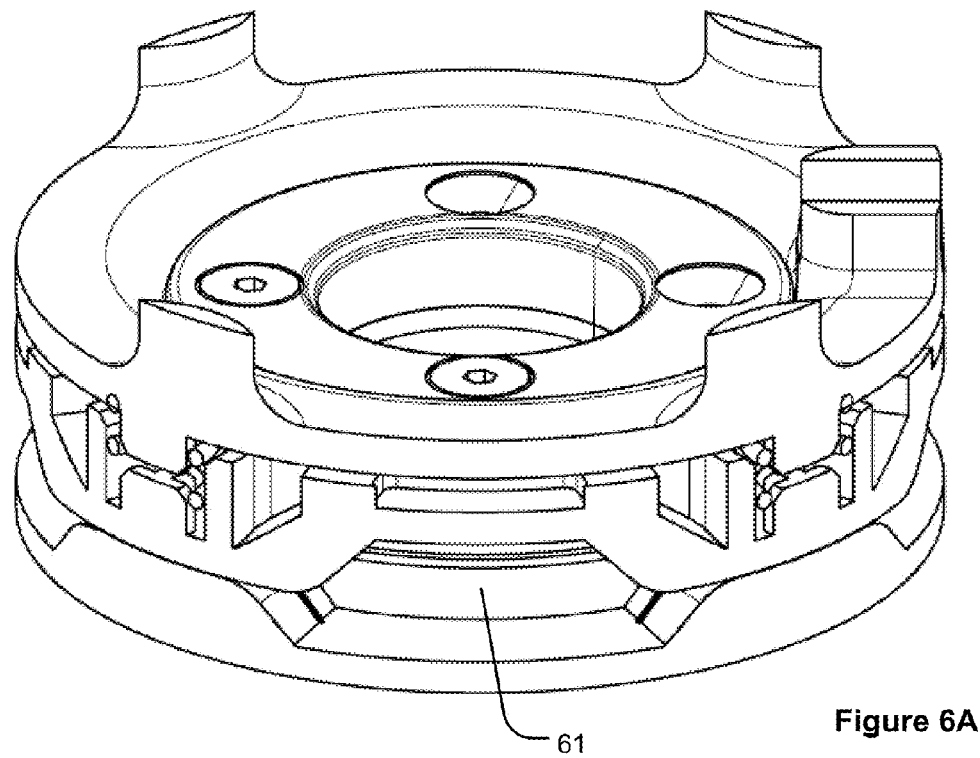
FIGS. 6A and 6B illustrate portions of the mounting assembly in a second or "unlocked" position.
Figure 6B:
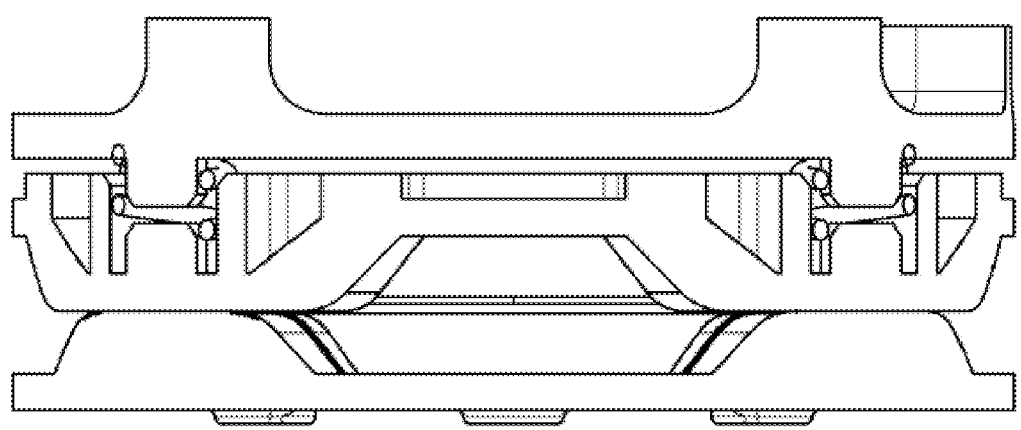

FIGS. 6A and 6B illustrate the mounting assembly 21 of FIGS. 5A and 5B however the mounting assembly 21 is now arranged in an unlocked configuration. FIG. 6A illustrates a perspective view and FIG. 6B illustrates a cross section. As shown in FIG. 6B when the mounting assembly 21 is arranged in the unlocked configurations gaps 61 are provided between the detent ring 39 and the detent housing 35 where the recess 47 of the detent housing 35 overlaps with the recess 43 of the detent ring 39. The detents 45 of the detent housing 35 may overlap with the detents 41 of the detent ring 39 so that, at least some of the first surface 31 remains in contact with the second surface 33.

As can be seen, and as discussed above, an assembly ring 29 is used to maintain the axial separation between the rear housing 36 and the detent housing 35; the assembly ring 29 therefore also causing the springs 32 to be compressed when the mounting assembly 21 is in the unlocked configuration. The assembly ring 29 is attached to the detent housing 35 by a retaining means, such as one or more screws 62. In embodiments 4 or 6 screws are used. The assembly ring 29 has a bevelled surface 64 (cooperating with a similarly bevelled surface of the rear plate 38) to facilitate the rotation of the assembly ring 62 with the detent housing 35 relative to the rear plate 38.

The mounting assembly 21 described above provides a rotational mount which may be suitable for attaching navigation devices 1 to motorcycles or other similar vehicles. Although it will be understood that the rotational mount may be used in a number of other situations and with any other suitable portable electronic device, where it is desired to provide an active mount, i.e. one that has an electrical connection for provided power and/or data transfer, for the electronic device, and one that allows the device to be rotated to a number of different orientations while docked in the mount. The use of the detents 41, 45 and recesses 43, 47 provides good haptic feedback to the user so that they can easily feel when the navigation device 1 is in the locked position. This may be particularly useful to users, such as motorbike riders, who may be wearing protective gloves. The use of the aperture 30 allows the electrical connections 26 to rotate with the navigation device 1. This keeps the electrical connection 26 simpler. This also reduces the number of moving parts within the electrical connection 26 and reduces the chance of failure or fatigue of such components.

In some embodiments of the invention a lock (or locking mechanism) 71 for the rotational mount 21 is provided.

FIGS. 7A to 7D illustrate a locking mechanism 71 which may be used to secure a portable electronic device to the mounting assembly 21. In the example of FIGS. 7A to 7D the locking mechanism 71 is arranged in a locked configuration. FIG. 7A illustrates a perspective view of the locking mechanism 71, FIG. 7B illustrates a plan view, FIG. 7C illustrates a front view and FIG. 7E illustrates a cross section through the line Y-LOCK-Y-LOCK.

The locking mechanism 71 comprises a plate member 73, a locking member 75 and a housing 77. The plate member 73 is configured to be placed between the rotational mount 21 and a mounting surface. The mounting surface may be support bracket, e.g. that is attachable to a handlebar of a motorcycle or other similar vehicle. The plate member 73 may be thin so that the locking mechanism 71 does not significantly increase the overall size of the mounting assembly 21.

The plate member 73 comprises a support surface. The surface has a lower portion 91 and a upper portion 93. The lower portion 91 is configured to be positioned adjacent to the body of the rotational mount 21. The lower portion 91 may have a similar size to the body of the rotational mount. The upper portion 93 may be configured to support the locking member 75. The upper portion 93 may comprise a hole (or gap) 76. The hole 76 may be sized and shaped so as to receive the locking member 75 when the locking member 75 is in the locked configuration.

The plate member 73 supports a housing 77 and a locking member 75. The housing 77 comprises first portions 78 which extend around a portion of the perimeter of the plate member 73 and form a recess into which the rotatable mount 21 can be positioned. The first portions 78 extend outwards from the lower portion 91 of the surface of the plate member 73. The first portions 78 of the housing 77 extend perpendicular to the lower portion 91 of the surface of the plate member 73. The housing 77 also comprises a second portion 79. The second portion 79 is configured to house the locking member 77. The second portion 79 extends outwards from the upper portion 93 of the surface of the plate member 73. The second portion 79 of the housing 77 extends perpendicular to the upper portion 93 of the surface of the plate member 73. The second portion 79 also comprises a key hole and key mechanism 81. The key hole 81 is provided on the top surface of the locking mechanism 71 which allows a user to easily access the key hole. The key mechanism 81 is provided within the housing 77. The key mechanism 81 is configured so that rotating a key in the key hole causes the locking member 75 to be rotated between locked and unlocked positions.

The locking member 75 is connected to the key mechanism 81 at a first end 85. This enables the locking member 75 to rotate between the locked and unlocked positions. The second end 87 of the locking member 75 comprises a lip 89. The lip 89 projects upwards from the locking member 75. In the illustrated embodiments the lip 89 projects upwards so that the locking member 75 extends beyond the housing 77. This may restrict the movement of the paddle 28 when the rotational mount 21 is attached to the locking mechanism 71.

In FIGS. 7A to 7D the locking member 75 is arranged in a locked position. In the locked position the locking member 75 extends perpendicular to the surface of the plate member 73. The locking member 75 extends outwards from the plate member 73 so that when the rotational mount 21 is attached to the locking mechanism 71 the locking member 75 is positioned underneath the paddle 28 of the rotational mount 21.

Figure 8A:
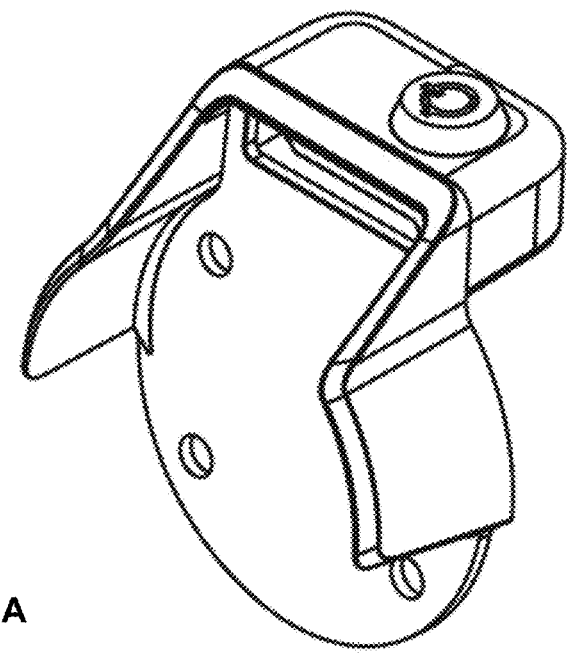
FIGS. 8A and 8B illustrate the lock for the mounting assembly in an unlocked configuration.
Figure 8B:
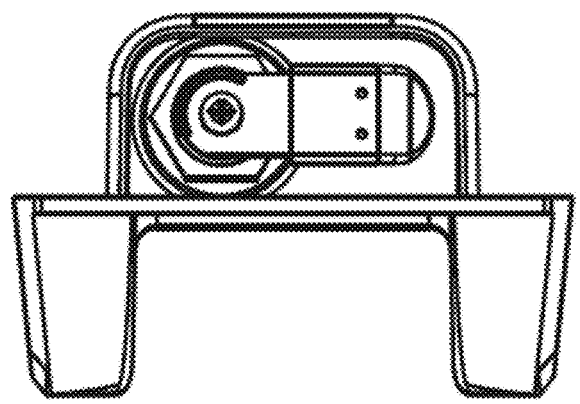

FIGS. 8A and 8B illustrate the locking mechanism 71 for the mounting assembly 21 in an unlocked configuration. FIG. 8A illustrates a perspective view of the locking mechanism 71 and FIG. 8D illustrates a bottom view. In the unlocked position the locking member 75 extends parallel to the surface of the plate member 73. The locking member 75 is positioned within the gap 76 so that the locking member 75 does not extend out from the surface of the plate member 73 or from the housing 77.

In the embodiments of the invention the locking member 75 is moved between the locked and unlocked configurations by rotating the locking member. In the illustrated embodiments the locking member 75 is rotated through 90°. A user may lock and unlock the locking mechanism 71 by turning a key in the key hole.

Figure 9A:
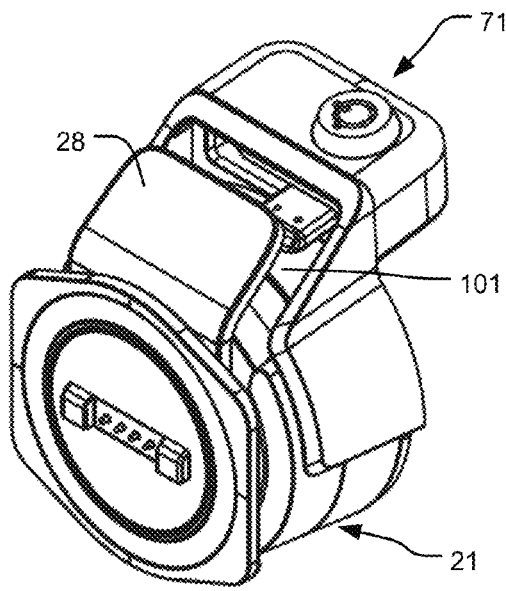
FIGS. 9A to 9D illustrate the mounting assembly in combination with the lock, wherein the mounting assembly is in a first angular position.
Figure 9B:
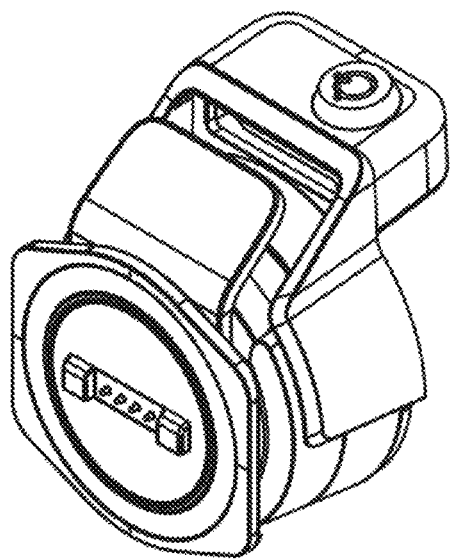
Figure 9C:
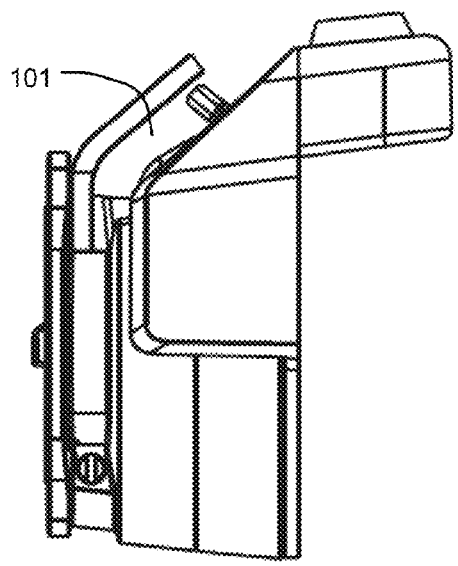
Figure 9D:
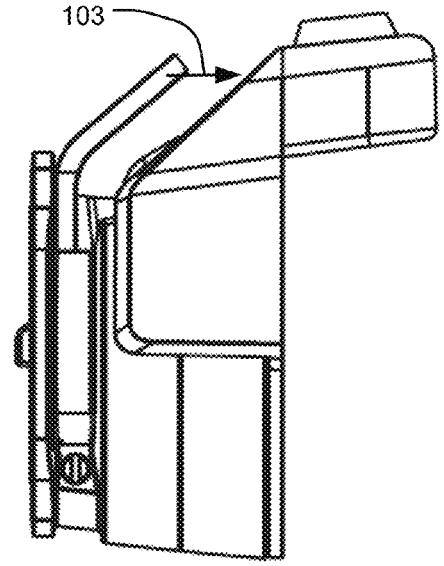

FIGS. 9A to 9D illustrate the locking mechanism 71 attached to a mounting assembly 21 where the mounting assembly 21 is attached in a first angular position. FIG. 9A illustrates a perspective view with the locking member in the locked configuration, FIG. 9B illustrates a perspective view with the locking member in the unlocked configuration, FIG. 9C illustrates a side view with the locking member 75 in the locked configuration, and FIG. 9D illustrates a side view with the locking member 75 in the unlocked configuration.

The body portion of the mount 21 fits into the recess formed by the housing 77. The rear surface of the mount 21 may be positioned adjacent to the surface of the plate member. The locking member 75 is positioned above the body portion of the mount 21. There is sufficient clearance between the locking member 75 and the body portion of the mount 21 to enable the locking member to move between the locked position and the unlocked position while the mount 21 is attached to the locking mechanism, 71.

When the rotational mount 21 is arranged in the first angular position the paddle 28 is aligned with the upper portion 93 of the plate member 73. In this angular position a portable electronic device attached to the mount 21 may be arranged in a landscape orientation.

When the mount 21 is attached in the first angular position a gap 101 is provided between the paddle 28 and the second portion 79 of the housing 77. When the locking member 75 is in an unlocked configuration as illustrated in FIGS. 9B and 9D the paddle 28 can be depressed in the direction indicated by the arrow 103 into the gap 103. The depression of the paddle 28 allows the portable electronic device to be released from the mount 21 as described above.

When the locking member 75 is in a locked configuration as illustrated in FIGS. 9A and 9C the locking member 75 is positioned underneath the paddle 28. In this configuration the locking member 75 prevents the paddle 28 from being depressed. The locking member 75 restricts the movement of the paddle 28 and prevents the portable electronic device from being released from the mount 21. This secures the portable electronic device to the mount 21 and may prevent the portable electronic device form being stolen.

Figure 10A:
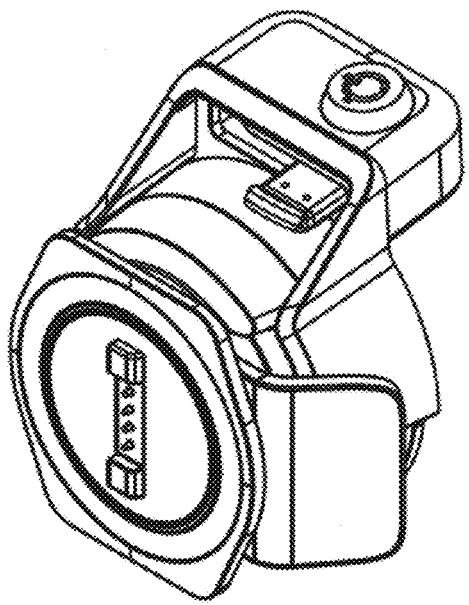
FIGS. 10A to 10D illustrate the mounting assembly in combination with the lock, wherein the mounting assembly is in a second angular position.
Figure 10B:
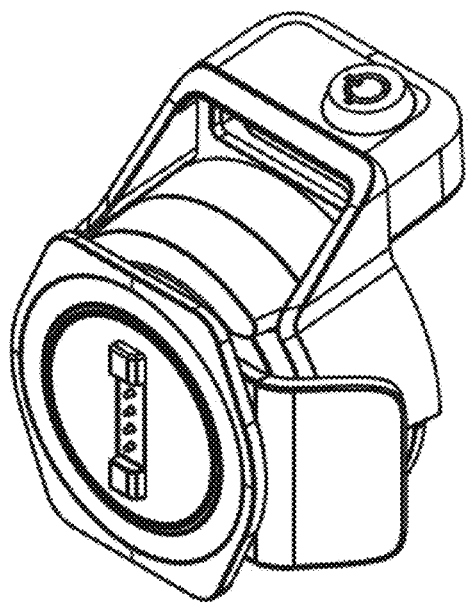
Figure 10C:
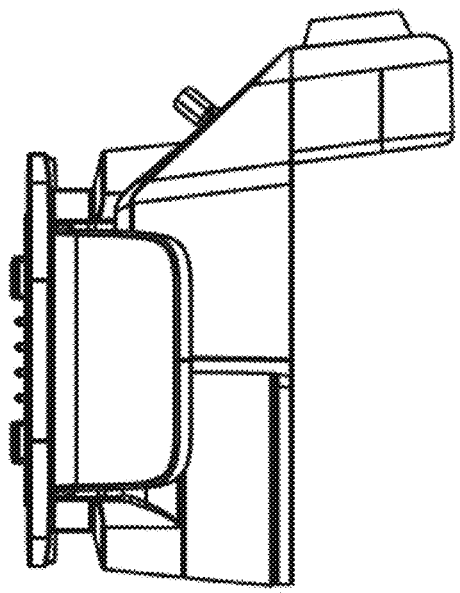
Figure 10D:
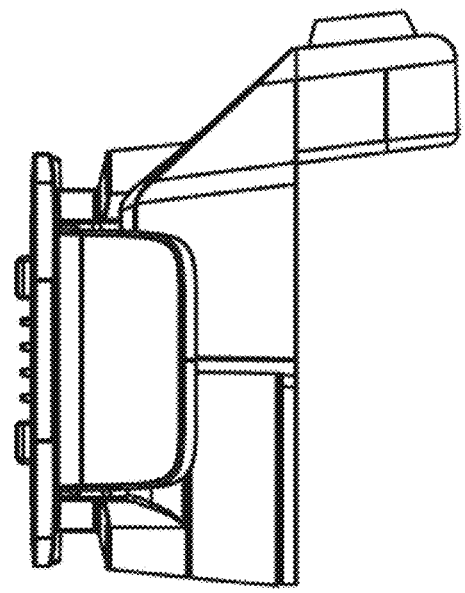

As the mount 21 is rotatable it is also necessary to prevent the portable electronic device from being removed when the portable electronic device is provided in a different angular configuration. FIGS. 10A to 10D illustrate the locking mechanism 71 attached to a mounting assembly 21 in a second angular position. FIG. 10A illustrates a perspective view with the locking member in the locked configuration, FIG. 10G illustrates a perspective view with the locking member in the unlocked configuration, FIG. 10C illustrates a side view with the locking member 75 in the locked configuration, and FIG. 10D illustrates a side view with the locking member 75 in the unlocked configuration.

In the second angular portion the paddle 28 is provided at a side of the mounting assembly so that the paddle is aligned with the lower portion 93 of the plate member 73. In this configuration a portable electronic device attached to the mount 21 may be arranged in a portrait orientation. It may be possible for the portable electronic device to be arranged in two different portrait orientations. The portable electronic device is arranged in a first portrait orientation, as illustrated in FIGS. 10A to 10D, by rotating the mount 21 90° clockwise from the first angular position. It is to be appreciated that the portable electronic device can also be arranged in a second portrait orientation by the rotating the mount 21 90° anti-clockwise from the first angular position.

In this second angular configuration the first portions 78 of the housing 77 prevent the paddle 28 from being depressed. In the example of FIGS. 10A to 10D a first portion 78 of the housing 77 abuts the rear of the paddle 28. This prevents the paddle 28 from being depressed and so prevents the portable electronic device form being released from the mount 21.

When the portable electronic device is in the second angular position the portable electronic device cannot be removed from the mount 21 regardless of the position of the locking member 75. In order to release the portable electronic device from the mount 21 a user rotates the mount 21 to the first angular position and turns the locking member 75 to the unlocked position.

The locking mechanisms 21 of the embodiments of the invention therefore prevent the portable electronic device from being removed from the rotational mount 21 unless the portable electronic device is in the first angular position and the locking mechanism is unlocked. This enables the portable electronic device to be locked to the mount 21 in a plurality of different angular configurations and prevents a user from bypassing the lock by rotating the portable electronic device to a different angular position. This allows a user to leave the portable electronic device attached to their motorcycle or other vehicle in any angular position. Furthermore the plate member 73 is arranged such that the locking mechanism can be easily positioned between the rotational mount 21 and the mounting surface, such as a support bracket, without significantly increasing the overall size of the mount 21.

As will be appreciated by those skilled in the art, various changes and modifications can be made to the above described embodiments whilst still falling within the scope of the present invention as set forth in the accompanying claims.

The invention claimed is:

1. A lock for a rotational mount, comprising:
a plate member arranged to be placed between the rotational mount and a mounting surface, the plate member having a support surface that is arranged to engage with the rotational mount;
a housing extending away from the plane of the support surface of the plate member, the housing comprising a first portion and a second portion, the first portion of the housing defining a gap with an edge of the plate member, and the second portion extending around at least a portion of the edge of the plate member; and
a locking member arranged to be movable between an unlocked position and a locked position, wherein the locking member, when in the locked position, extends away from the plane of the support surface of the plate member through the gap defined by the first portion of the housing.

2. The lock as claimed in claim 1, wherein the locking member, when in the unlocked position, extends parallel to the plane of the support surface of the plate member.

3. The lock as claimed in claim 1, wherein the locking member is arranged to protrude beyond the housing when in the locked position.

4. The lock as claimed in claim 1, wherein the locking member is arranged to be moved between the locked position and the unlocked position by turning a key.

5. A mounting system for a portable electronic device, comprising:
a rotational mount comprising:
a support member arranged to engage against a surface of a device mounted thereto; and
a paddle that can be depressed to allow the portable electronic device to be removed from the support member, wherein the rotational mount being rotatable between a plurality of different angular positions; and
a lock comprising:
a plate member arranged to be placed between the rotational mount and a mounting surface;
a locking member arranged to be movable between a locked position and an unlocked position, wherein, when in the locked position, the locking member prevents depression of the paddle when the rotational mount is in a first angular position, and, when in the unlocked position, the locking member allows depression of the paddle when the rotational mount is in the first angular position; and
a housing arranged to prevent depression of the paddle when the rotational mount is in a second angular position.

6. The mounting system as claimed in claim 5, wherein the plate member has a support surface that is arranged to engage with the rotational mount, and the lock further comprises the housing extending away from the plane of the support surface of the plate member, the housing comprising a first portion and a second portion, the first portion of the housing defining a gap with an edge of the plate member, and the second portion extending around at least a portion of the edge of the plate member, and wherein the locking member, when in the locked position, extends away from the plane of the support surface of the plate member through the gap defined by the first portion of the housing.

7. The mounting system as claimed in claim 5, wherein the locking member, when in the unlocked position, extends parallel to the plane of the support surface of the plate member.

8. The mounting system as claimed in claim 5, wherein the locking member is arranged to protrude beyond the housing when in the locked position.

9. The mounting system as claimed in claim 5, wherein the locking member is arranged to be moved between the locked position and the unlocked position by turning a key.

10. The mounting system as claimed in claim 5, wherein the first angular position of the rotational mount enables the portable electronic device to be mounted in a landscape orientation, and wherein the second angular position of the rotational mount enables the portable electronic device to be mounted in a portrait orientation.

11. A system comprising:
   a rotational mount comprising:
      a support member arranged to engage against a surface of a portable electronic device mounted thereto; and
      a paddle that can be depressed to allow the device to be removed from the support member, wherein the rotational mount being rotatable between a plurality of different angular positions;
   a lock comprising:
      a plate member arranged to be placed between the rotational mount and a mounting surface;
      a locking member arranged to be movable between a locked position and an unlocked position, wherein, when in the locked position, the locking member prevents depression of the paddle when the rotational mount is in a first angular position, and, when in the unlocked position, the locking member allows depression of the paddle when the rotational mount is in the first angular position; and
      a housing arranged to prevent depression of the paddle when the rotational mount is in a second angular position; and
   the portable electronic device mounted to the support member of the rotational mount.

* * * * *